United States Patent
Kühlmeyer et al.

(10) Patent No.: US 8,662,036 B2
(45) Date of Patent: Mar. 4, 2014

(54) METHOD FOR OPERATING AN INTERNAL COMBUSTION ENGINE HAVING A VARIABLE VALVE DRIVE

(71) Applicants: Jens Kühlmeyer, Gifhorn (DE); Paul Gnegel, Lehre (DE); Florian Noodt, Lehre OT Flechtorf (DE)

(72) Inventors: Jens Kühlmeyer, Gifhorn (DE); Paul Gnegel, Lehre (DE); Florian Noodt, Lehre OT Flechtorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 13/840,487

(22) Filed: Mar. 15, 2013

(65) Prior Publication Data
US 2013/0206104 A1  Aug. 15, 2013

Related U.S. Application Data

(63) Continuation of application No. PCT/EP2011/003149, filed on Jun. 27, 2011.

(30) Foreign Application Priority Data

Sep. 16, 2010  (DE) .................. 10 2010 045 710

(51) Int. Cl.
*F02D 13/00* (2006.01)
(52) U.S. Cl.
USPC ............ 123/90.15; 123/348; 123/568.14; 123/559.1
(58) Field of Classification Search
USPC .......... 123/345–348, 90.15, 568.11, 568.14, 123/559.1; 60/605.1
See application file for complete search history.

(56) References Cited

U.S. PATENT DOCUMENTS

| | | | | |
|---|---|---|---|---|
| 6,397,800 B2* | 6/2002 | Nohara et al. | ............. | 123/90.15 |
| 6,405,694 B2* | 6/2002 | Sato | ............. | 123/90.15 |
| 7,918,090 B2* | 4/2011 | Suzuki et al. | ............. | 60/602 |
| 8,235,015 B2* | 8/2012 | Murata | ............. | 123/90.17 |
| 2006/0201152 A1 | 9/2006 | Irisawa | | |
| 2007/0068156 A1 | 3/2007 | Rottenkolber et al. | | |
| 2010/0217504 A1 | 8/2010 | Fujii et al. | | |

FOREIGN PATENT DOCUMENTS

| | | |
|---|---|---|
| DE | 102 32 942 A1 | 2/2004 |
| DE | 10 2004 026 405 A1 | 12/2005 |
| DE | 10 2004 026 405 B4 | 9/2006 |

OTHER PUBLICATIONS

Search Report issued by the German Patent and Trademark Office for German Patent Application No. DE 10 2010 045 710.8, dated Jun. 27, 2011.

(Continued)

*Primary Examiner* — Hai Huynh
(74) *Attorney, Agent, or Firm* — Manfred Beck, P.A.

(57) ABSTRACT

A method for operating an internal combustion engine includes controlling a variable valve drive for at least one intake valve and at least one exhaust valve of at least one working cylinder of an internal combustion engine in dependence on operating states of the internal combustion engine. The valve drive is variable with regard to valve control times and/or a valve lift. The operating states of the internal combustion engine are defined by load demands, rotational speeds, load conditions and/or torque conditions. Valve operating states of the variable valve drive are set in dependence on the operating states of the internal combustion engine. The valve operating states can increase a charge of a working cylinder, provide an overlap of opening times of intake and exhaust valves, minimize fuel consumption or operate an intake valve in an expansion mode or according to a Miller/Atkinson process.

19 Claims, 4 Drawing Sheets

(56) References Cited

OTHER PUBLICATIONS

International Search Report for International Application No. PCT/EP2011/003149, dated Oct. 19, 2011.

International Preliminary Report on Patentability for International Application No. PCT/EP2011/003149 including Written Opinion of the International Searching Authority and translation thereof, dated Mar. 19, 2013.

* cited by examiner

METHOD FOR OPERATING AN INTERNAL COMBUSTION ENGINE HAVING A VARIABLE VALVE DRIVE

CROSS-REFERENCE TO RELATED APPLICATIONS

This application is a continuation, under 35 U.S.C. §120, of copending International Application No. PCT/EP2011/003149, filed Jun. 27, 2011, which designated the United States; this application also claims the priority, under 35 U.S.C. §119, of German Patent Application No. DE 10 2010 045 710.8, filed Sep. 16, 2010; the prior applications are herewith incorporated by reference in their entirety.

BACKGROUND OF THE INVENTION

Field of the Invention

The invention relates to a method for operating an internal combustion engine, particularly of a motor vehicle, wherein a variable valve drive for at least one intake valve and at least one exhaust valve of at least one working cylinder of the internal combustion engine is controlled in dependence on an operating state of the internal combustion engine, and wherein the valve drive is variable with regard to valve control times and/or valve lift.

Engines that are charged through the use of an exhaust-gas turbocharger (TC) exhibit in principle a delayed charging pressure buildup, the so-called turbo lag. This follows from the fact that, especially in case of a throttled operation of an Otto engine, the exhaust-gas mass flow that is available at the turbine is very small and thus little exhaust-gas energy is available as a turbine drive power. Only with an increasing intake manifold pressure, the mass flow increases and thus also the available exhaust-gas energy behind the engine increases. When there are load demands, there is thus always a target gap between the required setpoint mass flow through the engine and the—in the first moments—real, actual mass flow.

German Patent No. DE 10 2004 026 405 B4 discloses a method for operating an internal combustion engine having a charger device and having an intake valve drive that is variable with respect to its intake valve control times and/or its intake valve lift. Upon detection of a positive load demand during the operation of the charging device, the at least one variable intake valve drive is in this case controlled in such a manner that an available lift reserve and/or intake-closes control time reserve is used to increase the amount of the charge. The time required to meet the load demand can hereby be considerably reduced and thus the response characteristic of the charged internal combustion engine can be shortened.

SUMMARY OF THE INVENTION

It is accordingly an object of the invention to provide a method for operating an internal combustion engine which overcomes the above-mentioned disadvantages of the heretofore-known methods of this general type and which can provide an operating point dependent open-loop control/closed-loop control strategy for a variable valve drive of an internal combustion engine with an improved symbiosis between a combustion process and the performance of an exhaust-gas turbocharger (TC).

With the foregoing and other objects in view there is provided, in accordance with the invention, a method for operating an internal combustion engine, which includes the following steps:

controlling a variable valve drive for at least one intake valve and at least one exhaust valve of at least one working cylinder of an internal combustion engine in dependence on an operating state of the internal combustion engine, wherein the variable valve drive is variable with regard to at least one of valve control times and a valve lift;

precompressing combustion air with an exhaust-gas turbocharger;

setting, in a first operating state of the internal combustion engine with a high load demand and a low rotational speed, a first valve operating state of the variable valve drive, wherein, in the first valve operating state, at least one intake valve is set such that there is an increase of a charge of a working cylinder assigned to the at least one intake valve;

setting, in a second operating state of the internal combustion engine with a high load demand and a high rotational speed, a second valve operating state of the variable valve drive, wherein, in the second valve operating state, at least one intake valve and at least one exhaust valve of at least one working cylinder are set such that there is an overlap of opening times of the at least one intake valve and the at least one exhaust valve and such that there is a minimized fuel consumption;

setting, in a third operating state of the internal combustion engine with one of no load demand and a small load demand below a given threshold value and at a low to medium part-load, a third valve operating state of the variable valve drive, wherein, in the third valve operating state, at least one intake valve and at least one exhaust valve of at least one working cylinder are set such that there is an overlap of opening times of the at least one intake valve and the at least one exhaust valve and such that there is a minimized fuel consumption;

setting, in a fourth operating state of the internal combustion engine with one of no load demand and a small load demand below a given threshold value and at a high part-load, a fourth valve operating state of the variable valve drive, wherein, in the fourth valve operating state, at least one intake valve and at least one exhaust valve of at least one working cylinder are set such that there is an overlap of opening times of the at least one intake valve and the at least one exhaust valve and such that there is a minimized fuel consumption;

setting, in a fifth operating state of the internal combustion engine with a high load demand above a given threshold value and at a high part-load, a fifth valve operating state of the variable valve drive, wherein, in the fifth valve operating state, at least one intake valve and at least one exhaust valve of at least one working cylinder are set such that a temporal overlap of opening times of the at least one intake valve and the at least one exhaust valve is greater than in case of a setting with a minimized fuel consumption; and setting, in a sixth operating state of the internal combustion engine with a maximum torque, a sixth valve operating state of the variable valve drive, wherein, in the sixth valve operating state, at least one intake valve is operated in one of an expansion mode and according to a Miller/Atkinson process.

In other words, according to the invention, there is provided a method for operating an internal combustion engine, particularly of a motor vehicle, wherein, in dependence on an operating state of the internal combustion engine, a with regard to valve control times and/or valve lift variable valve drive for at least one intake valve and at least one exhaust valve of at least one working cylinder of the internal combustion engine is controlled, and wherein combustion air is precompressed by an exhaust-gas turbocharger, wherein:

in a first operating state of the internal combustion engine with a high load demand and a low rotational speed, a first valve operating state of the variable valve drive is set, wherein in the first valve operating state at least one intake valve is set so that there is an increase of the charge of the working cylinder assigned to this intake valve;

in a second operating state of the internal combustion engine with a high load demand and a high rotational speed, a second valve operating state of the variable valve drive is set, wherein in the second valve operating state at least one intake valve and at least one exhaust valve of at least one working cylinder are set such that there is an overlap of the opening times of this intake valve and exhaust valve and such that there is a minimized fuel consumption;

in a third operating state of the internal combustion engine with no or a small load demand below a predetermined threshold value and at a low to medium part-load, a third valve operating state of the variable valve drive is set, wherein in the third valve operating state at least one intake valve and at least one exhaust valve of at least one working cylinder are set such that there is an overlap of the opening times of this intake valve and exhaust valve and such that there is a minimized fuel consumption;

in a fourth operating state of the internal combustion engine with no or a small load demand below a predetermined threshold value and at a high part-load, a fourth valve operating state of the variable valve drive is set, wherein in the fourth valve operating state at least one intake valve and at least one exhaust valve of at least one working cylinder are set such that there is an overlap of the opening times of this intake valve and exhaust valve and such that there is a minimized fuel consumption;

in a fifth operating state of the internal combustion engine with a high load demand above a predetermined threshold value and at a high part-load, a fifth valve operating state of the variable valve drive is set, wherein in the fifth valve operating state at least one intake valve and at least one exhaust valve of at least one working cylinder are set such that a temporal overlap of opening times of this intake valve and exhaust valve is greater than in case of a setting with a minimized fuel consumption; and in a sixth operating state of the internal combustion engine at maximum torque, a sixth valve operating state of the variable valve drive is set, wherein in the sixth valve operating state at least one intake valve is operated in an expansion mode or according to a Miller/Atkinson process.

This has the advantage that through the use of the additional freedoms of a variable valve drive (VVT), the valve drive strategy for the respective operating characteristics of dynamic, torque at low rotational speeds (low end torque), rated power, part-load, etc. is chosen such that the interactions between the exhaust-gas turbocharger and the combustion processes are always optimal.

Another mode of the method according to the invention includes setting the first valve operating state of the variable valve drive when the first operating state is in a first region on a load-rotational speed characteristic map of the internal combustion engine, wherein the first region is delimited by a given rotational speed range, an effective engine torque of 0 and a function of a maximum torque that is output by the internal combustion engine in dependence on a rotational speed, wherein the given rotational speed range is a rotational speed from 1,000 1/min to 2,000 1/min, a rotational speed from 1,000 1/min to 2,500 1/min, a rotational speed from 1,000 1/min to 3,500 1/min or a rotational speed from 1,000 1/min to 4,500 1/min.

Another mode of the method according to the invention includes terminating the first valve operating state when a torque that is output by the internal combustion engine has reached a given torque or, in particular, a demanded torque.

Another mode of the method according to the invention includes setting the second valve operating state of the variable valve drive when the second operating state is in a second region on a load-rotational speed characteristic map of the internal combustion engine, wherein the second region is delimited by a rotational speed from a given rotational speed to a maximum rotational speed of the internal combustion engine, an effective engine torque of 0 and a function of a maximum torque that is output by the internal combustion engine in dependence on a rotational speed, wherein the given rotational speed is a rotational speed of 2,000 1/min, a rotational speed of 2,500 1/min, a rotational speed of 3,500 1/min or a rotational speed of 4,500 1/min.

Another mode of the method according to the invention includes setting the third valve operating state of the variable valve drive when the third operating state is in a third region on a load-rotational speed characteristic map of the internal combustion engine, wherein the third region is delimited by a rotational speed from 1,000 1/min to a maximum rotational speed of the internal combustion engine, an effective engine torque of 0 and an effective engine torque of 40% to 80% of a maximum torque that is output by the internal combustion engine.

Another mode of the method according to the invention includes setting the fourth valve operating state of the variable valve drive when the fourth operating state is in a fourth region on a load-rotational speed characteristic map of the internal combustion engine, wherein the fourth region is delimited by a rotational speed from 1,000 1/min to a maximum rotational speed of the internal combustion engine, an effective engine torque of 40% to 80% of a maximum torque that is output by the internal combustion engine and a function of a maximum torque that is output by the internal combustion engine in dependence on a rotational speed.

Another mode of the method according to the invention includes setting the fifth valve operating state of the variable valve drive when the fifth operating state is in a fifth region on a load-rotational speed characteristic map of the internal combustion engine, wherein the fifth region is delimited by a rotational speed from 1,000 1/min to a maximum rotational speed of the internal combustion engine, an effective engine torque of 40% to 80% of a maximum torque that is output by the internal combustion engine and a function of a maximum torque that is output by the internal combustion engine in dependence on a rotational speed.

Another mode of the method according to the invention includes delaying the step of setting the fifth valve operating state of the variable valve drive by a given number of cycles in the working cylinder, wherein the given number of cycles ranges from 1 to 10 cycles.

Another mode of the method according to the invention includes setting the sixth valve operating state of the variable valve drive when the sixth operating state is in a sixth region on a load-rotational speed characteristic map of the internal combustion engine, wherein the sixth region is determined by a function of a maximum torque that is output by the internal combustion engine in dependence on a rotational speed.

Another mode of the method according to the invention includes setting, in the first operating state, the fifth valve operating state of the variable valve drive instead of the first valve operating state, when the first operating state is in a seventh region within the first region on the load-rotational speed characteristic map of the internal combustion engine, wherein the seventh region is delimited within the first region by the function of the maximum torque that is output by the internal combustion engine torque in dependence on the rotational speed and an effective engine torque of 40% to 80% of the maximum torque that is output by the internal combustion engine.

Another mode of the method according to the invention includes using, as input parameters for detecting a respective operating state of the internal combustion engine, at least one parameter selected from the group including an intake manifold pressure, an intake manifold temperature, an engine rotational speed, a current actual charge, a deviation between a setpoint charge and an actual charge, a load demand gradient, a full-load detection and, if applicable, further operating parameters of the internal combustion engine, wherein parameter values are directly measured or calculated in corresponding models.

Another mode of the method according to the invention includes using, for a detection of a condition for a load demand, at least one parameter selected from the group including a threshold value for a difference between a setpoint charging pressure and an actual charging pressure, a threshold value for a difference between a setpoint charge and an actual charge, and a threshold value for a load demand gradient; and using, for a detection of a condition for an engine rotational speed, a threshold value for an engine rotational speed range.

Another mode of the method according to the invention includes determining the load demand gradient as a function of an accelerator pedal gradient of an accelerator pedal of a motor vehicle in which the internal combustion engine is disposed.

Another mode of the method according to the invention includes using, for a detection of conditions for the sixth operating state, a full load detection and at least one threshold value selected from the group including a threshold value for a difference between a setpoint charging pressure and an actual charging pressure and a threshold value for a difference between a setpoint charge and an actual charge.

Another mode of the method according to the invention includes switching from the first valve operating state to the fourth or the sixth valve operating state when a torque that is output by the internal combustion engine has reached a given torque, in particular a demanded torque.

Another mode of the method according to the invention includes setting, in the first valve operating state, at least one exhaust valve to a short opening duration from 170° CA (crank angle) to 185° CA, in particular from 170° CA to 180° CA.

Another mode of the method according to the invention includes using the internal combustion engine in a motor vehicle.

A further improvement in the optimization of the interaction between the exhaust gas turbocharger and the combustion process is achieved in that the first valve operating state of the variable valve drive is set when the first operating state is in a first region on a load-rotational speed characteristic map of the internal combustion engine, the first region being delimited by a rotational speed from 1,000 1/min to 2,000 1/min, in particular to 2,500 1/min, 3,500 1/min or 4,500 1/min, an effective engine torque of 0 and a function of the maximum torque that is output by the internal combustion engine in dependence on the rotational speed (dynamic at low rotational speeds).

A further improvement in the optimization of the interaction between the exhaust gas turbocharger and the combustion process is achieved in that the first valve operating state is terminated when the torque that is output by the internal combustion engine has reached a predetermined torque, in particular the demanded torque.

A further improvement in the optimization of the interaction between the exhaust gas turbocharger and the combustion process is achieved in that the second valve operating state of the variable valve drive is set when the second operating state is in a second region on a load-rotational speed characteristic map of the internal combustion engine delimited by a rotational speed from 2,000 1/min, in particular from 2,500 1/min, 3,500 1/min or 4,500 1/min, to the maximum rotational speed of the internal combustion engine, an effective engine torque of 0 and a function of the maximum torque that is output by the internal combustion engine in dependence on the rotational speed (dynamic at high rotational speeds).

A further improvement in the optimization of the interaction between the exhaust gas turbocharger and the combustion process is achieved in that the third valve operating state of the variable valve drive is set when the third operating state is in a third region on a load-rotational speed characteristic map of the internal combustion engine delimited by a rotational speed from 1,000 1/min to the maximum rotational speed of the internal combustion engine, an effective engine torque of 0 and an effective engine torque from 40% to 80% of the maximum torque that is output by the internal combustion engine (constant operation at a low part-load).

A further improvement in the optimization of the interaction between the exhaust gas turbocharger and the combustion process is achieved in that the fourth valve operating state of the variable valve drive is set when the fourth operating state is in a fourth region on a load-rotational speed characteristic map of the internal combustion engine delimited by a rotational speed from 1,000 1/min to the maximum rotational speed of the internal combustion engine, an effective engine torque from 40% to 80% of the maximum torque that is output by the internal combustion engine and a function of the maximum torque that is output by the internal combustion engine in dependence on the rotational speed (constant operation at a high part-load).

A further improvement in the optimization of the interaction between the exhaust gas turbocharger and the combustion process is achieved in that the fifth valve operating state of the variable valve drive is set when the fifth operating state is in a fifth region on a load-rotational speed characteristic map of the internal combustion engine delimited by a rotational speed from 1,000 1/min to the maximum rotational speed of the internal combustion engine, an effective engine torque from 40% to 80% of the maximum torque that is output by the internal combustion engine and a function of the maximum torque that is output by the internal combustion engine in dependence on the rotational speed (dynamic at high effective mean pressure (pme) or, respectively, intake pressure).

A further improvement in the optimization of the interaction between the exhaust gas turbocharger and the combustion process is achieved in that the fifth valve operating state of the variable valve drive is set delayed by a predetermined number of cycles in the working cylinder, wherein the predetermined number of cycles ranges from 1 to 10 cycles.

A further improvement in the optimization of the interaction between the exhaust gas turbocharger and the combustion process is achieved in that the sixth valve operating state of the variable valve drive is set when the sixth operating state is in a sixth region on a load-rotational speed characteristic map of the internal combustion engine, the sixth region being determined by a function of the maximum torque that is output by the internal combustion engine in dependence on the rotational speed (constant operation FL-line).

A further improvement in the optimization of the interaction between the exhaust gas turbocharger and the combustion process is achieved in that in the first operating state, instead of the first valve operating state, the fifth valve operating state of the variable valve drive is set when the first operating state is in a seventh region within the first region on a load-rotational speed characteristic map of the internal combustion engine delimited within the first region by a function of the maximum torque that is output by the internal combustion engine in dependence on the rotational speed and an effective engine torque of 40% to 80% of the maximum torque that is output by the internal combustion engine (dynamic at low rotational speed and high pme (effective mean pressure) or, respectively, intake pressure).

A particularly good and reliable detection of the current operating state of the internal combustion engine is achieved in that as input parameters for detecting the respective operating state of the internal combustion engine an intake manifold pressure, an intake manifold temperature, an engine rotational speed, a current actual charge, a deviation between the setpoint charge and the actual charge, a load demand gradient, for example in the form of an accelerator pedal gradient of an accelerator pedal of a motor vehicle, in which the internal combustion engine is disposed, and/or a full-load (FL) detection and/or optionally further operating parameters of the internal combustion engine are used, wherein the quantities are either measured directly or calculated in corresponding models.

A particularly good and reliable detection of the condition for the load demand and the engine rotational speed is achieved in that for a detection of the condition for the load demand, a threshold value for a difference between a setpoint charging pressure and an actual charging pressure, a threshold value for a difference between a setpoint charge and an actual charge and/or a threshold value for a load demand gradient, for example in the form of an accelerator pedal gradient of an accelerator pedal of a motor vehicle in which the internal combustion engine is disposed, are used and for the detection of the condition for the engine rotational speed a threshold value for an engine rotational speed range is used.

A particularly good and reliable detection of the conditions for the sixth operating state is achieved in that for the detection of the conditions for the sixth operating state a full load detection and a threshold value for the difference between a setpoint charging pressure and an actual charging pressure and/or a threshold value for the difference between a setpoint charge and an actual charge is used.

A further improvement in the optimization of the interaction between the exhaust-gas turbocharger and the combustion process is achieved in that a switching from the first valve operating state to the fourth or sixth valve operating state occurs when the torque that is output by the internal combustion engine has reached a predetermined torque, in particular the demanded torque.

A further improvement in the optimization of the interaction between the exhaust gas turbocharger and the combustion process is achieved in that, in the first valve operating state, at least one exhaust valve is set to a short opening duration from 170° CA to 185° CA, in particular from 170° CA to 180° CA.

Other features which are considered as characteristic for the invention are set forth in the appended claims.

Although the invention is illustrated and described herein as embodied in a method for operating an internal combustion engine having a variable valve drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
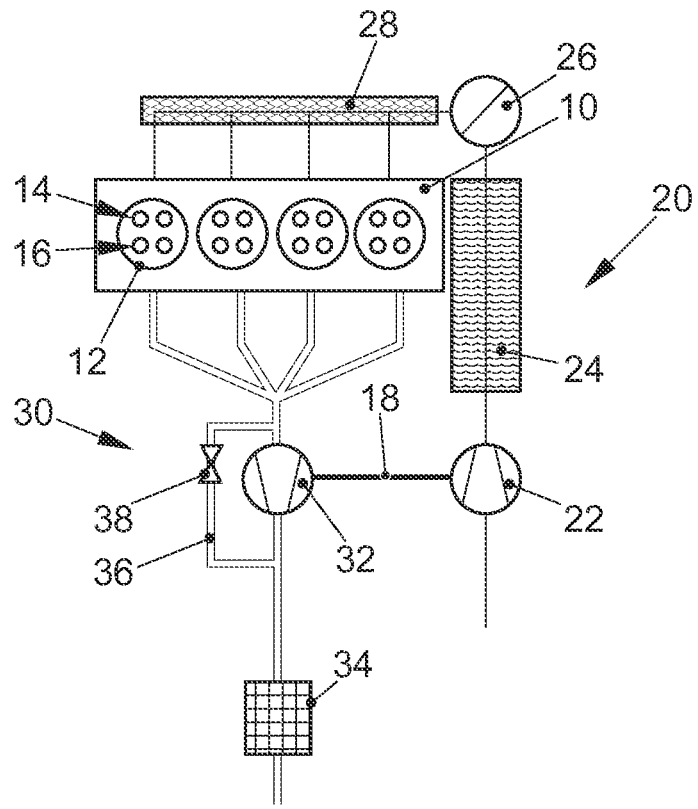
FIG. 1 is a schematic view of an exemplary embodiment of an internal combustion engine for carrying out the method according to the invention.

Referring now to the figures of the drawings in detail and first, particularly, to FIG. 1 thereof, there is shown in an exemplary manner a preferred embodiment of an internal combustion engine according to the invention. The internal combustion engine includes an engine block 10 having working cylinders 12, wherein each working cylinder 12 has assigned thereto at least one intake valve 14 and at least one exhaust valve 16, and the internal combustion engine includes an exhaust-gas turbocharger 18. The internal combustion engine has a valve drive (variable valve timing, VVT) that is variable or, respectively, is variably adjustable with regard to valve control times and/or valve lift for at least one intake valve 14 and at least one exhaust valve 16 of at least one working cylinder 12 of the internal combustion engine.

Through the use of a combustion air system 20, the working cylinders 12 are supplied with combustion air via the intake valves 14. The following is disposed in the combustion air system 20 when viewed in the flow direction of the combustion air, a compressor 22 of the turbocharger 18, an optional first charge-air cooler (CAC) 24, a throttle valve (TV) 26 and a second charge air cooler (CAC) 28.

Through the use of an exhaust-gas system 30, exhaust-gas is discharged from the working cylinders 12 via the exhaust valves 16. The following is disposed in the exhaust-gas system 30 when viewed in the flow direction of the exhaust-gas, a turbine 32 of the exhaust-gas turbocharger 18, and a catalytic converter 34. The turbine 32 has a bypass line 36 with a wastegate valve 38. The turbine 32 is selectively provide with a fixed or a variable turbine geometry (VTG). The compressor 22 is alternatively configured as an electrically driven, so-called E-booster.

Figure 2:
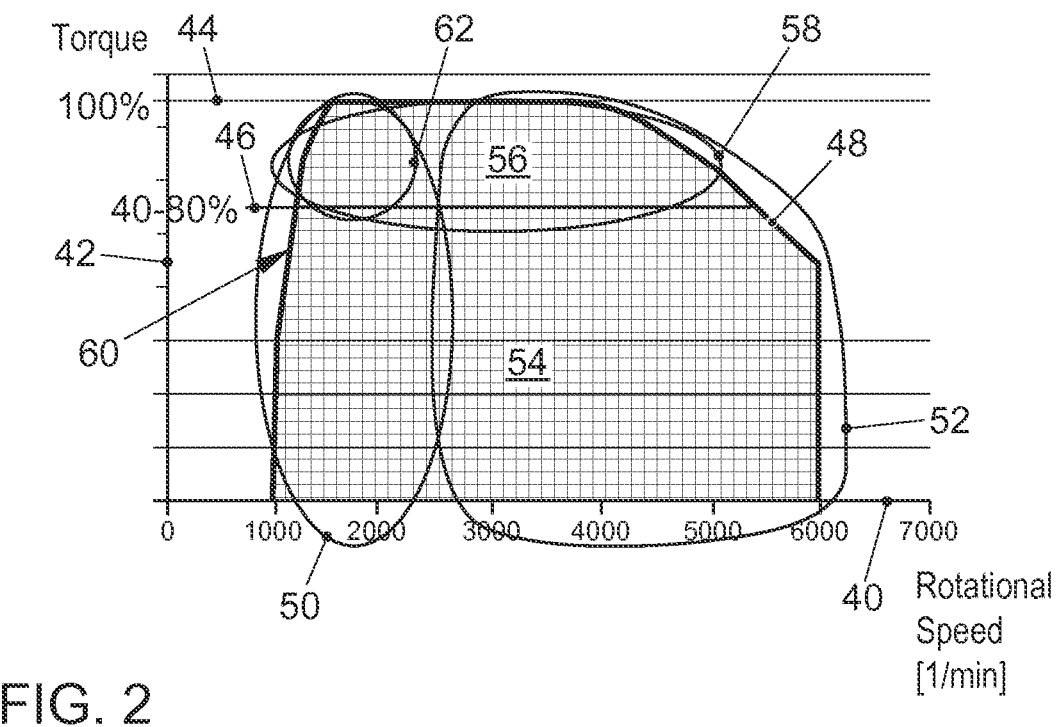
FIG. 2 is a graph of a load-rotational speed characteristic map of the internal-combustion engine according to FIG. 1.

FIG. 2 shows in an exemplary manner a load-rotational speed characteristic map for the internal combustion engine of FIG. 1, wherein an engine rotational speed in [1/min] is plotted against a horizontal axis 40 and an effective engine torque in [Nm] is plotted against a vertical axis 42. A first horizontal line 44 indicates a maximum engine torque that is output by the internal combustion engine. This is defined as "100% engine torque." A second horizontal line 46 indicates 40% to 60% of the maximum engine torque ("100% engine torque"). A function 48 illustrates the maximum engine torque 42 that is output by the internal combustion engine 42 in dependence on the rotational speed 40. This engine torque is not identical to "100% engine torque" for all rotational speeds 40. At low rotational speeds below approximately 1,500 1/min and at high rotational speeds above approximately 4,000 1/min the maximum engine torque is partly significantly lower than "100% engine torque" 44.

In the load-rotational speed characteristic map according to FIG. 2, the following regions for possible operating states of the internal combustion engine are defined: A first region 50, which is delimited by a rotational speed from 1,000 1/min to 2,000 1/min, in particular up to 2,500 1/min, 3,500 1/min or 4,500 1/min, an effective engine torque of 0 (horizontal axis 40) and the function 48. A second region 52 which is delimited by a rotational speed 40 from 2,000 1/min, in particular from 2,500 1/min, 3,500 1/min or 4,500 1/min, to the maximum rotational speed 40 of the internal combustion engine, an effective engine torque of 0 (horizontal axis 40), and the function 48. The maximum rotational speed 40 of the internal combustion engine in this example is 6,000 1/min. A third region 54 which is delimited by a rotational speed 40 from 1,000 1/min to the maximum rotational speed of the internal combustion engine, an effective engine torque of 0 (horizontal axis 40) and an effective engine torque from 40% to 80% of the maximum torque that is output by the internal combustion engine (second line 46). A fourth region 56 which is delimited by a rotational speed from 1,000 1/min to the maximum rotational speed of the internal combustion engine, an effective engine torque of 40% to 80% of the maximum torque that is output by the internal combustion engine torque (second line 46) and the function 48. A fifth region 58 which is delimited by a rotational speed from 1,000 1/min to the maximum rotational speed of the internal combustion engine, an effective engine torque of 40% to 80% of the maximum torque that is output by the internal combustion engine (second line 46) and the function 48. A sixth region 60 which is determined by the function 48, i.e. all points in the load-rotational speed characteristic map on the maximum torque curve 48 at which the maximum torque is output in accordance with the current rotational speed 40. A seventh region 62 which is delimited within the first region 50 by the function 48 and the effective engine torque of 40% to 80% of the maximum torque that is output by the internal combustion engine (second line 46). The seventh region 62 contains all those points of the load-rotational speed characteristic map according to FIG. 2, that are included in both, the first region 50 as well as the fifth region 58 as an intersection of these two regions 50, 58. The fourth and fifth region 56, 58 include essentially the same points of the load-rotational speed characteristics map, but for different operating states of the internal combustion engine, as will be explained in more detail below. Besides being defined by the rotational speed 40 and the effective engine torque 42, the operating state of the internal combustion engine is additionally defined by a load demand or, respectively, a dynamic demand. Thus, the internal combustion engine can be operated at a point of the load-rotational speed characteristic map according to FIG. 2 both, with a high and with a low load demand gradient or with a constant load demand (stationary operation). A load demand or, respectively, a load demand gradient results for example from a position of an accelerator pedal or an accelerator pedal gradient of a motor vehicle, which is equipped with the internal combustion engine as a drive unit.

According to the invention it is provided that the variable valve drive is adjusted in a very specific manner in dependence on the operating state of the internal combustion engine assigned to the above-explained regions and load states or, respectively, load demand states or, respectively, load demand gradients, such that different valve operating states are set in a manner that is operating point dependent and such that a as yet unachievable cycle-accurate symbiosis between the combustion process and the power or, respectively, performance of the exhaust-gas turbocharger is the result. The term "cycle-accurate" here refers to the working cycles in the working cylinders of the internal combustion engine.

Fully variable valve drive systems (VVT) vary, in addition to a large phase shift, the lift or, respectively, the opening duration in more than only two discrete positions on the intake side and exhaust side and they do this also with high actuation speeds. These VVT systems are used in the method according to the invention, wherein the respective optimum valve drive parameters are no longer adjusted in a quasi-stationary manner, but are adjusted in a cycle-dependent manner.

In the engine control, a distinction is made between the following basic operating characteristics or, respectively, operating states of the internal combustion engine:

(1) High dynamic demand (load demand gradient) at low engine rotational speeds (2) High dynamic demand (load demand gradient) at high engine rotational speeds (3) Low or no (=constant speed driving) dynamic demand (load demand gradient) in the low and middle part-load (rotational speed independent)

(4) Low or no dynamic demand (load demand gradient) in the high part-load (5) High dynamic demand (load demand gradient) in the high part-load (6) Operation on the maximum torque curve 48

(7) Optionally, a distinction can furthermore occur between a low and a medium output load at point (1)

As input parameters for the detection of the respective operating state of the internal combustion engine, and for triggering a respective VVT operating range or, respectively, valve operating state preferably an intake manifold pressure, an intake manifold temperature, the engine rotational speed 40, a current actual charge, a deviation between the setpoint charge and the actual charge, a load demand gradient, for example in the form of an accelerator pedal gradient of an accelerator pedal of a motor vehicle, which is equipped with the internal combustion engine as a drive unit, a full-load (FL) detection and optionally further quantities are used, wherein the quantities are either measured directly or calculated in corresponding models.

As triggering criteria for the dynamic detection in the operating states (1), (2), (5) and (7), preferably, the following quantities are used: a threshold for the difference between the setpoint charging pressure and the actual charging pressure or, respectively the setpoint charge and the actual charge; a threshold for a load demand gradient, for example in the form of an accelerator pedal gradient of an accelerator pedal of a motor vehicle, which is equipped with the internal combustion engine as a drive unit; a threshold for an engine rotational speed range.

For the detection of the operating state (6) and a corresponding triggering of an associated sixth valve operating state, the FL detection (full-load detection) and a threshold for the difference between the setpoint charging pressure and the actual charging pressure or, respectively the setpoint charge and the actual charge are used. The distinction between a high and a low dynamic demand is based on a threshold for the load demand gradient, for example in the form of an accelerator pedal gradient of an accelerator pedal of a motor vehicle, which is equipped with the internal combustion engine as a drive unit, and a threshold for the difference between the setpoint charging pressure and the actual charging pressure or, respectively, the setpoint charge and the actual charge.

The criteria for an "operating region manager", which detects in which operating region a current operating state of the internal combustion engine is located and which valve operating state is accordingly set, are shown in an exemplary manner in FIGS. 3 to 8 through the use of structograms. In general, the dynamic operating regions are prioritized over the other operating regions in case of a correspondingly recognized dynamic demand.

Figure 3:
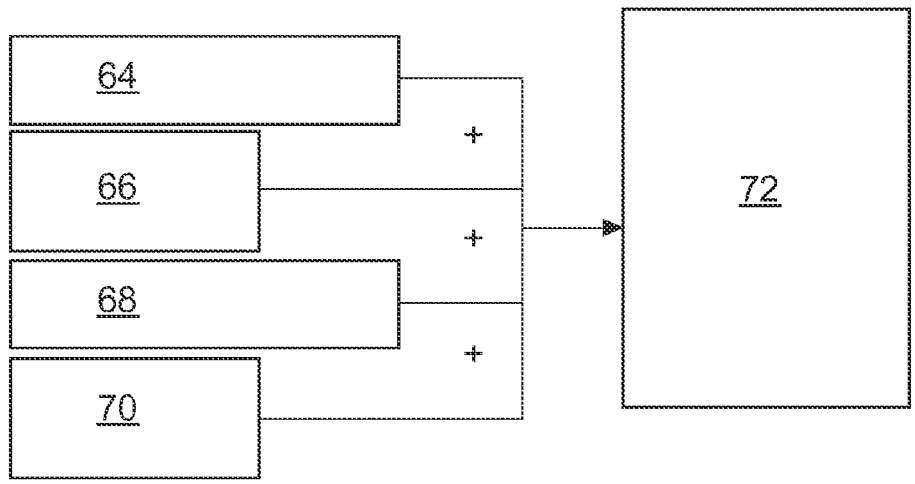
FIG. 3 is a structogram for the unlocking of a first valve operating state of a variable valve drive of an internal combustion engine in dependence on an operating state of the internal combustion engine in accordance with the invention.

In FIG. 3, for an unlocking of a first valve operating state for the first operating region 50 it is checked in a first block 64, whether a load demand gradient, for example in the form of an accelerator pedal gradient of an accelerator pedal of a motor vehicle, which is equipped with the internal combustion engine as a drive unit, is greater than a predetermined load demand gradient threshold pedgrad_thres, in a second block 66 it is checked whether a difference between a setpoint charging pressure and an actual charging pressure is greater than a predetermined second threshold value, in a third block 68 it is checked whether an engine rotational speed is smaller than a predetermined engine rotational speed threshold nmot_thres and in a fourth block 70 it is checked whether further relevant error bits have the value "false" (Error_Bits=false). If the queries in all four blocks 64, 66, 68 and 70 have a positive result (value "+" or "true"), then, in a fifth block 72, a first valve operating state for the first operating region is unlocked (enabled) and the variable valve drive is set according to the first valve operating state.

Figure 4:
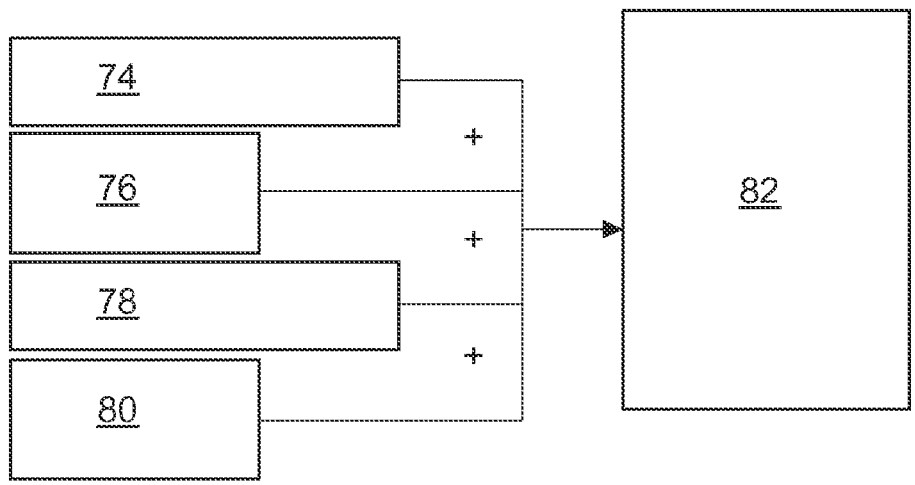
FIG. 4 is a structogram for the unlocking of a second valve operating state of a variable valve drive of an internal combustion engine in dependence on an operating state of the internal combustion engine in accordance with the invention.

In FIG. 4, for an unlocking of a second valve operating state for the second operating region 52 it is checked in a sixth block 74, whether a load demand gradient, for example in the form of an accelerator pedal gradient of an accelerator pedal of a motor vehicle, which is equipped with the internal combustion engine as a drive unit, is greater than a predetermined load demand gradient threshold pedgrad_thres, in a seventh block 76 it is checked whether a difference between a setpoint charging pressure and an actual charging pressure is greater than a predetermined second threshold value, in an eighth block 78 it is checked whether an engine rotational speed is greater than a predetermined engine rotational speed threshold nmot_thres and in a ninth block 80 it is checked whether further relevant error bits have the value "false" (Error_Bits=false). If the queries in all four blocks 74, 76, 78 and 80 have a positive result (value "+" or "true"), then, in a tenth block 82, a second valve operating state for the second operating region 52 is unlocked (enabled) and the variable valve drive is set according to the first valve operating state.

Figure 5:
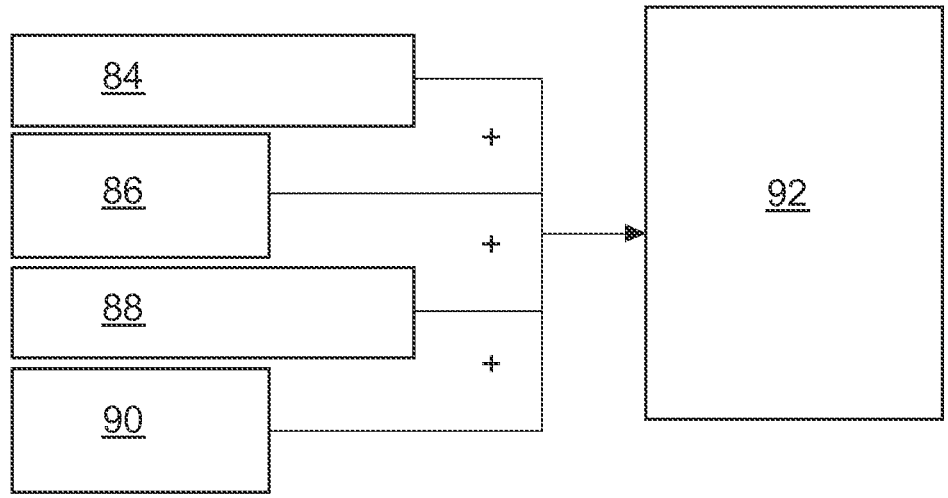
FIG. 5 is a structogram for the unlocking of a third valve operating state of a variable valve drive of an internal combustion engine in dependence on an operating state of the internal combustion engine in accordance with the invention.

In FIG. 5, for an unlocking of a third valve operating state for the third operating region 54 it is checked in an eleventh block 84, whether a load demand gradient, for example in the form of an accelerator pedal gradient of an accelerator pedal of a motor vehicle, which is equipped with the internal combustion engine as a drive unit, is smaller than a predetermined load demand gradient threshold value pedgrad_thres, in a twelfth block 86 it is checked whether a difference between a setpoint charging pressure and an actual charging pressure is greater than a predetermined first threshold value, in a thirteenth block 88 it is checked whether a load value is smaller than a predetermined load threshold value load_thres 46 and in a fourteenth block 90 it is checked whether further relevant error bits have the value "false" (Error_Bits=false). If the queries in all four blocks 84, 86, 88 and 90 have a positive result (value "+" or "true"), then, in a fifteenth block 92, a third valve operating state for the third operating region 54 is unlocked and the variable valve drive is set according to the first valve operating state.

Figure 6:
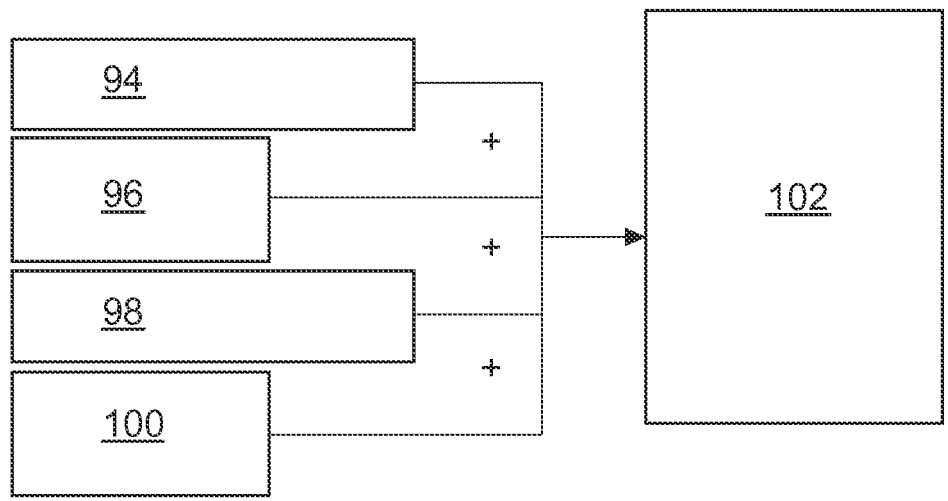
FIG. 6 is a structogram for the unlocking of a fourth valve operating state of a variable valve drive of an internal combustion engine in dependence on an operating state of the internal combustion engine in accordance with the invention.

In FIG. 6, for an unlocking of a fourth valve operating state for the fourth operating region 56 it is checked in a sixteenth block 94, whether a load demand gradient, for example in the form of an accelerator pedal gradient of an accelerator pedal of a motor vehicle, which is equipped with the internal combustion engine as a drive unit, is smaller than a predetermined load demand gradient threshold value pedgrad_thres, in a seventeenth block 96 it is checked whether a difference between a setpoint charging pressure and an actual charging pressure is greater than a predetermined second threshold value, in an eighteenth block 98 it is checked whether a load value is greater than a predetermined load threshold value load_thres 46 and in a nineteenth block 100 it is checked whether further relevant error bits have the value "false" (Error_Bits=false). If the queries in all four blocks 94, 96, 98 and 100 have a positive result (value "+" or "true"), then, in a twentieth block 102, a fourth valve operating state for the fourth operating region 56 is unlocked and the variable valve drive is set according to the first valve operating state.

Figure 7:
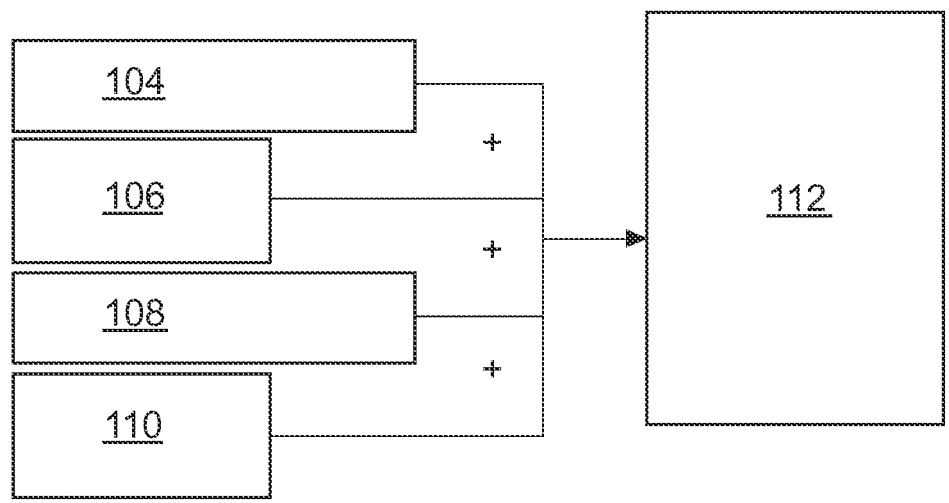
FIG. 7 is a structogram for the unlocking of a fifth valve operating state of a variable valve drive of an internal combustion engine in dependence on an operating state of the internal combustion engine in accordance with the invention.

In FIG. 7, for an unlocking of a fifth valve operating state for the fifth operating region 58 it is checked in a twenty-first block 104, whether a load demand gradient, for example in the form of an accelerator pedal gradient of an accelerator pedal of a motor vehicle, which is equipped with the internal combustion engine as a drive unit, is greater than a predetermined load demand gradient threshold value pedgrad_thres, in a twenty-second block 106 it is checked whether a difference between a setpoint charging pressure and an actual charging pressure is greater than a predetermined second threshold value, in a twenty-third block 108 it is checked whether a load value is greater than a predetermined load threshold value load_thres 46 and in a twenty-fourth block 110 it is checked whether further relevant error bits have the value "false" (Error_Bits=false). If the queries in all four blocks 104, 106, 108 and 110 have a positive result (value "+" or "true"), then, in a twenty-fifth block 112, a fifth valve operating state for the fifth operating region 58 is unlocked and the variable valve drive is set according to the first valve operating state.

Figure 8:
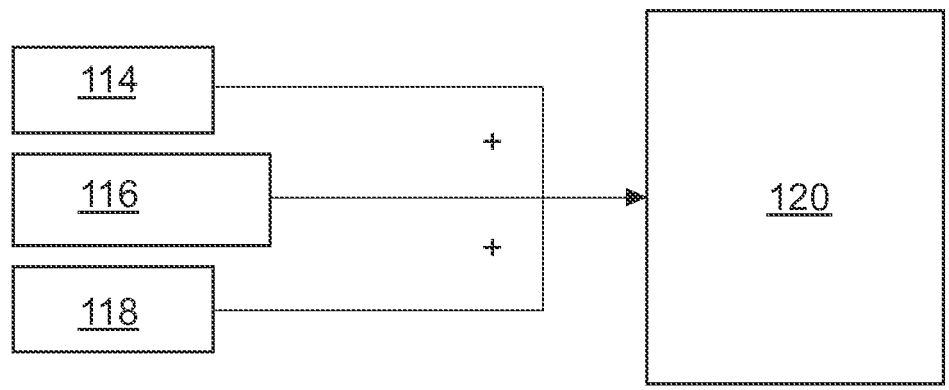
FIG. 8 is a structogram for the unlocking of a sixth valve operating state of a variable valve drive of an internal combustion engine in dependence on an operating state of the internal combustion engine in accordance with the invention.

In FIG. 8, for an unlocking of a sixth valve operating state for the sixth operating region 60 it is checked in a twenty-sixth block 114 whether the Bit_FL is active, i.e. whether a full load state with maximum torque for the current engine rotational speed is present or, respectively, whether the operating state of the internal combustion engine in the load-rotational speed characteristic map is on the function 48, in a twenty-seventh block 116 it is checked whether a difference between a setpoint charging pressure and an actual charging pressure is smaller than a predetermined first threshold value, and in a twenty-eighth block 118 it is checked whether further relevant error bits have the value "false" (Error_Bits=false). If the queries in all three blocks 114, 116, and 118 have a positive result (value "+" or "true"), then, in a twenty-ninth block 120, a sixth valve operating state for the sixth operating region 60 is unlocked and the variable valve drive is set according to the first valve operating state.

For the above-explained structograms, the first threshold value is smaller than the second threshold value. For the engine rotational speed threshold value nmot_thres for example a value of 2,000 1/min, in particular 2,500 1/min, 3,500 1/min or 4,500 1/min is selected.

For the different operating regions 50, 52, 54, 58 and 60 the following valve drive states are provided:

For the first valve operating state, the valve events on the exhaust side are set to short control times in a manner such that on the exhaust-gas side a cross-talk between the two working cylinders, which succeed one another in the ignition sequence, is avoided. For example with an I4 engine (4 cylinder in-line engine), the valve opening times of the exhaust valves are set to 170°-180° CA (crankshaft angle), up to a maximum of 185° CA. The intake valves operate in the first cycles after the load demand in dependence on the piston stroke in a manner that increases the charge. At the latest upon reaching the target torque, a switch to another operating region or, respectively, valve operating state occurs, for example, to the fourth valve operating state for the fourth region 56 or the sixth valve operating state for the sixth region 60.

In the second operating region 52 at high engine rotational speeds, the response characteristic of the exhaust-gas turbocharger (TC) is usually very good. A support on the part of the valve drive in a manner that increases the charge is not necessary. The control of the intake valves (IV) and exhaust valves (EV) is performed with an optimal lift and overlap with regard to the fuel consumption for the engine-/TC combination. A cycle-based control of the valves in this operating region is not envisioned. The boundary between the first operating region 50 and the second operating region 52 is for example between an engine rotational speed 40 of 2,000 1/min and 3,500 1/min. The second operating region 52 begins however at the latest above 4,500 1/min.

In the third operating region 54 there is also no cycle-controlled valve control. Here, the IV-/EV lifts (intake valve lifts/exhaust valve lifts) and phase overlaps that are optimal for the consumption of the respective engine-/TC combination are set.

In the fourth operating region 56, the open loop control-/closed loop control strategy for the VVT corresponds to that of the strategy described for the second operating region 52. The demarcation to the third region 54 is here however not on the basis of the engine rotational speed 40, but on the basis of the load applied prior to the dynamic demand. This demarcation is ideally in a range between 40% and 80% of the maximum torque (or, respectively, the maximum air mass/charge) at the respective engine rotational speed. The optimal consumption parameters for the VVT are not abandoned in this operating region. Optionally, in this fourth operating region 56 already the valve drive strategies as described below for the sixth operating region 60 are used.

The requirement for the fifth operating region 58 is as a result of the function logic always a setting of the VVT that has an optimal consumption. Upon detection of a high dynamic demand a switch is made to a larger overlap in order to promote the acceleration of the TC. Depending on the engine-/TC combination there is an increase in the overlap immediately for the first cycle after the dynamic detection or delayed by a few cycles. In case of a delay, ideally delay times from 1 to 10 cycles are set.

When operating on the maximum torque curve of the engine, i.e. in the sixth operating region 60, the IV (intake valves) are operated in an expansion mode which is known in the prior art. Optionally, a charge exchange strategy, which is known as Miller-/Atkinson process, is also used in this sixth region 60.

If also at low engine rotational speeds 40 a distinction is made between a high and a low output load upon detection of a dynamic demand, then, at low output loads, the VVT is controlled according to the first operating region 50 and, at high output loads, the VVT is operated according to the VVT strategy or, respectively, the valve operating state described for the fifth operation region 58.

The invention claimed is:

1. A method for operating an internal combustion engine, the method which comprises:

controlling a variable valve drive for at least one intake valve and at least one exhaust valve of at least one working cylinder of an internal combustion engine in dependence on an operating state of the internal combustion engine, wherein the variable valve drive is variable with regard to at least one of valve control times and a valve lift;

precompressing combustion air with an exhaust-gas turbocharger;

setting, in a first operating state of the internal combustion engine with a high load demand and a low rotational speed, a first valve operating state of the variable valve drive, wherein, in the first valve operating state, at least one intake valve is set such that there is an increase of a charge of a working cylinder assigned to the at least one intake valve;

setting, in a second operating state of the internal combustion engine with a high load demand and a high rotational speed, a second valve operating state of the variable valve drive, wherein, in the second valve operating state, at least one intake valve and at least one exhaust valve of at least one working cylinder are set such that there is an overlap of opening times of the at least one intake valve and the at least one exhaust valve and such that there is a minimized fuel consumption;

setting, in a third operating state of the internal combustion engine with one of no load demand and a small load demand below a given threshold value and at a low to medium part-load, a third valve operating state of the variable valve drive, wherein, in the third valve operating state, at least one intake valve and at least one exhaust valve of at least one working cylinder are set such that there is an overlap of opening times of the at least one intake valve and the at least one exhaust valve and such that there is a minimized fuel consumption;

setting, in a fourth operating state of the internal combustion engine with one of no load demand and a small load demand below a given threshold value and at a high part-load, a fourth valve operating state of the variable valve drive, wherein, in the fourth valve operating state, at least one intake valve and at least one exhaust valve of at least one working cylinder are set such that there is an overlap of opening times of the at least one intake valve and the at least one exhaust valve and such that there is a minimized fuel consumption;

setting, in a fifth operating state of the internal combustion engine with a high load demand above a given threshold value and at a high part-load, a fifth valve operating state of the variable valve drive, wherein, in the fifth valve operating state, at least one intake valve and at least one exhaust valve of at least one working cylinder are set such that a temporal overlap of opening times of the at least one intake valve and the at least one exhaust valve is greater than in case of a setting with a minimized fuel consumption; and setting, in a sixth operating state of the internal combustion engine with a maximum torque, a sixth valve operating state of the variable valve drive, wherein, in the sixth valve operating state, at least one intake valve is operated in one of an expansion mode and according to a Miller/Atkinson process.

2. The method according to claim 1, which comprises setting the first valve operating state of the variable valve drive when the first operating state is in a first region on a load-rotational speed characteristic map of the internal combustion engine, wherein the first region is delimited by a given rotational speed range, an effective engine torque of 0 and a function of a maximum torque that is output by the internal combustion engine in dependence on a rotational speed, wherein the given rotational speed range is a speed range selected from the group consisting of a rotational speed from 1,000 1/min to 2,000 1/min, a rotational speed from 1,000 1/min to 2,500 1/min, a rotational speed from 1,000 1/min to 3,500 1/min and a rotational speed from 1,000 1/min to 4,500 1/min.

3. The method according to claim 2, which comprises setting, in the first operating state, the fifth valve operating state of the variable valve drive instead of the first valve operating state, when the first operating state is in a seventh region within the first region on the load-rotational speed characteristic map of the internal combustion engine, wherein the seventh region is delimited within the first region by the function of the maximum torque that is output by the internal combustion engine torque in dependence on the rotational speed and an effective engine torque of 40% to 80% of the maximum torque that is output by the internal combustion engine.

4. The method according to claim 1, which comprises terminating the first valve operating state when a torque that is output by the internal combustion engine has reached one of a given torque and a demanded torque.

5. The method according to claim 1, which comprises setting the second valve operating state of the variable valve drive when the second operating state is in a second region on a load-rotational speed characteristic map of the internal combustion engine, wherein the second region is delimited by a rotational speed from a given rotational speed to a maximum rotational speed of the internal combustion engine, an effective engine torque of 0 and a function of a maximum torque that is output by the internal combustion engine in dependence on a rotational speed, wherein the given rotational speed is a rotational speed selected from the group consisting of a rotational speed of 2,000 1/min, a rotational speed of 2,500 1/min, a rotational speed of 3,500 1/min and a rotational speed of 4,500 1/min.

6. The method according to claim 1, which comprises setting the third valve operating state of the variable valve drive when the third operating state is in a third region on a load-rotational speed characteristic map of the internal combustion engine, wherein the third region is delimited by a rotational speed from 1,000 1/min to a maximum rotational speed of the internal combustion engine, an effective engine torque of 0 and an effective engine torque of 40% to 80% of a maximum torque that is output by the internal combustion engine.

7. The method according to claim 1, which comprises setting the fourth valve operating state of the variable valve drive when the fourth operating state is in a fourth region on a load-rotational speed characteristic map of the internal combustion engine, wherein the fourth region is delimited by a rotational speed from 1,000 1/min to a maximum rotational speed of the internal combustion engine, an effective engine torque of 40% to 80% of a maximum torque that is output by the internal combustion engine and a function of a maximum torque that is output by the internal combustion engine in dependence on a rotational speed.

8. The method according to claim 1, which comprises setting the fifth valve operating state of the variable valve drive when the fifth operating state is in a fifth region on a load-rotational speed characteristic map of the internal combustion engine, wherein the fifth region is delimited by a rotational speed from 1,000 1/min to a maximum rotational speed of the internal combustion engine, an effective engine torque of 40% to 80% of a maximum torque that is output by the internal combustion engine and a function of a maximum torque that is output by the internal combustion engine in dependence on a rotational speed.

9. The method according to claim 1, which comprises delaying the step of setting the fifth valve operating state of the variable valve drive by a given number of cycles in the working cylinder, wherein the given number of cycles ranges from 1 to 10 cycles.

10. The method according to claim 1, which comprises setting the sixth valve operating state of the variable valve drive when the sixth operating state is in a sixth region on a load-rotational speed characteristic map of the internal combustion engine, wherein the sixth region is determined by a function of a maximum torque that is output by the internal combustion engine in dependence on a rotational speed.

11. The method according to claim 1, which comprises using, as input parameters for detecting a respective operating state of the internal combustion engine, at least one parameter selected from the group consisting of an intake manifold pressure, an intake manifold temperature, an engine rotational speed, a current actual charge, a deviation between a setpoint charge and an actual charge, a load demand gradient, a full-load detection and, if applicable, further operating parameters of the internal combustion engine, wherein parameter values are one of directly measured and calculated in corresponding models.

12. The method according to claim 11, which comprises determining the load demand gradient as a function of an accelerator pedal gradient of an accelerator pedal of a motor vehicle in which the internal combustion engine is disposed.

13. The method according to claim 1, which comprises:
using, for a detection of a condition for a load demand, at least one parameter selected from the group consisting of a threshold value for a difference between a setpoint charging pressure and an actual charging pressure, a threshold value for a difference between a setpoint charge and an actual charge, and a threshold value for a load demand gradient; and
using, for a detection of a condition for an engine rotational speed, a threshold value for an engine rotational speed range.

14. The method according to claim 13, which comprises determining the load demand gradient as a function of an accelerator pedal gradient of an accelerator pedal of a motor vehicle in which the internal combustion engine is disposed.

15. The method according to claim 1, which comprises using, for a detection of conditions for the sixth operating state, a full load detection and at least one threshold value selected from the group consisting of a threshold value for a difference between a setpoint charging pressure and an actual charging pressure and a threshold value for a difference between a setpoint charge and an actual charge.

16. The method according to claim 1, which comprises switching from the first valve operating state to one of the fourth and the sixth valve operating state when a torque that is output by the internal combustion engine has reached one of a given torque and a demanded torque.

17. The method according to claim 1, which comprises setting, in the first valve operating state, at least one exhaust valve to a short opening duration from 170° CA to 185° CA.

18. The method according to claim 1, which comprises setting, in the first valve operating state, at least one exhaust valve to a short opening duration from 170° CA to 180° CA.

19. The method according to claim 1, which comprises using the internal combustion engine in a motor vehicle.

* * * * *